(12) United States Patent
Obuchi (10) Patent No.: US 11,456,016 B1
(45) Date of Patent: Sep. 27, 2022

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Masaki Obuchi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/469,324

(22) Filed: Sep. 8, 2021

(30) Foreign Application Priority Data

Mar. 18, 2021 (JP) .............................. JP2021-044496

(51) Int. Cl.
  *G11B 20/12* (2006.01)
  *G11B 20/18* (2006.01)
  *G11B 5/48* (2006.01)
  *G11B 5/00* (2006.01)

(52) U.S. Cl.
  CPC ........ *G11B 20/1816* (2013.01); *G11B 5/4806* (2013.01); *G11B 20/1217* (2013.01); *G11B 2005/0021* (2013.01); *G11B 2020/183* (2013.01)

(58) Field of Classification Search
  None
  See application file for complete search history.

(56) References Cited

U.S. PATENT DOCUMENTS

| 4,525,822 | A  | * | 6/1985  | Nishimura  | G11B 7/24085 |
|           |    |   |         |            | 375/302 |
| 5,233,584 | A  | * | 8/1993  | Kulakowski | G11B 27/36 |
|           |    |   |         |            | 369/44.29 |
| 7,984,328 | B1 |   | 7/2011  | Coatney    | |
| 2002/0105900 | A1 | * | 8/2002 | Yoshimoto | G06F 3/0644 |
| 2006/0098559 | A1 | * | 5/2006 | Hino       | G11B 7/00736 |
| 2006/0288153 | A1 | * | 12/2006 | Tanaka   | G11C 16/22 |
|           |    |   |         |            | 711/E12.099 |
| 2007/0109942 | A1 | * | 5/2007 | Ito        | G11B 7/1267 |
| 2008/0008055 | A1 | * | 1/2008 | Yoshimoto | G11B 7/00745 |
| 2010/0232270 | A1 | * | 9/2010 | Nakamura  | G11B 7/24038 |
|           |    |   |         |            | 369/283 |
| 2011/0264842 | A1 |   | 10/2011 | Nakanishi et al. | |
| 2012/0008471 | A1 | * | 1/2012 | Kuraoka    | G11B 7/0045 |
| 2012/0218877 | A1 | * | 8/2012 | Akahoshi   | G11B 20/1883 |
|           |    |   |         |            | 369/84 |
| 2017/0139605 | A1 | * | 5/2017 | Shinozaki  | G06F 3/0683 |

FOREIGN PATENT DOCUMENTS

JP 2008-305061 A 12/2008
JP 2011-081889 A 4/2011

* cited by examiner

*Primary Examiner* — Peter Vincent Agustin
(74) *Attorney, Agent, or Firm* — Allen & Overy LLP (57) ABSTRACT

According to one embodiment, a magnetic disk device includes a plurality of magnetic disks, a plurality of magnetic heads provided correspondingly to the plurality of magnetic disks and configured to carry out read/write of data from/to the magnetic disks, and a control section configured to, when the magnetic head is in a second status before the magnetic head enters the first status, change setting in such a manner as to change a first memory area of a magnetic disk corresponding to the magnetic head in the second status among memory areas constituted of the plurality of magnetic disks to a second memory area in which a write count is limited.

9 Claims, 5 Drawing Sheets

| Head number | Health status value | | | |
|---|---|---|---|---|
| | Read error count | Read retry count | Attribute value | STO fatigue degree |
| 101 | | | | |
| 102 | | | | |
| ⋮ | ⋮ | ⋮ | ⋮ | ⋮ |
| 10N-1 | | | | |
| 10N | | | | |

MAGNETIC DISK DEVICE

CROSS-REFERENCE TO RELATED APPLICATIONS

This application is based upon and claims the benefit of priority from Japanese Patent Application No. 2021-044496, filed Mar. 18, 2021, the entire contents of which are incorporated herein by reference.

FIELD

Embodiments described herein relate generally to a magnetic disk device

BACKGROUND

A technique of setting a nonvolatile memory into a read-only mode in which write to the nonvolatile memory is inhibited at the point in time when the number of times of formatting carried out by access devices reaches a predetermined formatting upper limit number of times relating to the number of rewriting guarantee times of the nonvolatile memory, and erased blocks are exhausted is known. According to this technique, even when a nonvolatile memory having a small number of rewriting guarantee times is used, it is possible to prevent the nonvolatile memory from being rewritten more than or equal to the number of rewriting guarantee times by appropriately setting the formatting upper limit number of times.

A magnetic disk device utilizes a magnetic head including a write element and read element to write data to a magnetic disk or read data from the magnetic disk. In the magnetic disk device, a plurality of sets each of which is constituted of a magnetic disk and magnetic heads are provided, and the plurality of magnetic disks constitute memory areas of the magnetic disk device. Accordingly, when a write element of a certain magnetic head is damaged, it becomes impossible to write data to the magnetic disk corresponding to the magnetic head of the damaged write element. Accordingly, there is a need to carry out management of the memory areas of the magnetic disk device by taking the damage to the magnetic head into consideration.

Embodiments described herein aim to provide a magnetic disk device in which the memory areas are managed.

DETAILED DESCRIPTION

In general, according to one embodiment, a magnetic disk device includes a plurality of magnetic disks, a plurality of magnetic heads provided correspondingly to the plurality of magnetic disks and configured to carry out read/write of data from/to the magnetic disks, and a control section configured to, when the magnetic head is in a second status before the magnetic head enters the first status, change setting in such a manner as to change a first memory area of a magnetic disk corresponding to the magnetic head in the second status among memory areas constituted of the plurality of magnetic disks to a second memory area in which a write count is limited.

Embodiments will be described hereinafter with reference to the accompanying drawings. Note that the disclosure is merely an example, and the invention is not limited by the contents of the embodiments provided below. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

Figure 1:
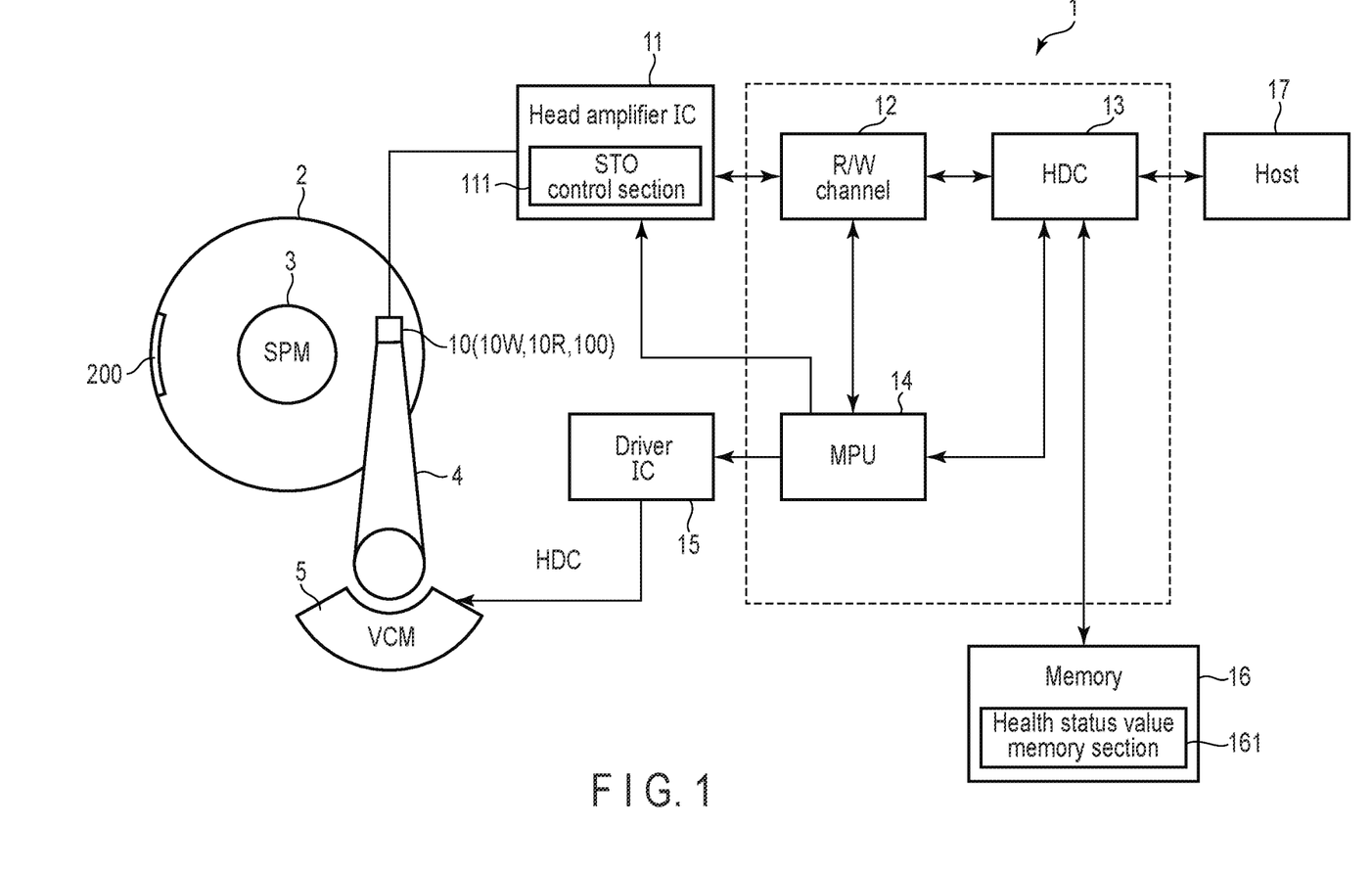
FIG. 1 is a block diagram showing an example of the configuration of a magnetic disk device according to a first embodiment.

FIG. 1 is a block diagram showing an example of the configuration of a magnetic disk device according to a first embodiment. As shown in FIG. 1, the magnetic disk device 1 is configured as, for example, a hard disk drive (HDD) and is provided with magnetic disks 2, spindle motor (SEM) 3, actuator 4, voice coil motor (VCM) 5, magnetic head 10, head amplifier IC 11, R/W channel 12, hard disk controller (HDC) 13, microprocessor unit (MPU % 14, driver IC 15, and memory 16. Further, the magnetic disk device 1 is connectable to a host computer (host) 17. The magnetic head 10 is provided with a write head (recording head: writer) 10W, read head (reproducing head: reader) 10R, and spin-torque-oscillator (STO) 100 which is a high-frequency oscillation element. It should be noted that the R/W channel 12, HDC 13, and MPU 14 may also be incorporated into a one-chip integrated circuit. It should be noted that the actuator 4 represents any one of actuators 41 to 4N of FIG. 2 to be described later, and magnetic head 10 represents any one of magnetic heads 101 to IN of FIG. 2 to be described later.

The magnetic disk 2 includes a substrate constituted of, for example, a nonmagnetic material and formed into a circular disk-like shape. On each of the surfaces of the substrate, a soft magnetic layer formed of a material exhibiting soft magnetic characteristics and functioning as a foundation layer, magnetic recording layer having magnetic anisotropy in the direction perpendicular to the disk surface and formed on the upper layer of the soft magnetic layer, and protective film layer formed on the upper layer of the magnetic recording layer are stacked on top of each other in layers in the order described. Here, the layers closer to the magnetic head 10 in the direction to the magnetic head 10 are defined as upper layers. The magnetic head 10 accesses the magnetic disk 2 from the top surface of the magnetic disk 2. In this embodiment, as will be described later with reference to FIG. 2, the magnetic disk 2 and magnetic heads 10 are configured in such a manner that the magnetic heads 10 can access the magnetic disk 2 from both sides thereof.

The magnetic disk 2 is fixed to the spindle motor (SPM) 3 and is rotated at a predetermined rotational speed by the SPM 3. In this embodiment, as will be described later, a plurality of magnetic disks 2 are attached to the SPM 3. The SPM 3 is driven by a drive current (or drive volt-age) to be supplied thereto from the driver IC 15. A data pattern is recorded/reproduced on/from the magnetic disk 2 by the magnetic head 10.

The actuator 4 is provided in such a manner that the actuator 4 can freely be turned, and the magnetic head 10 is supported on the tip section of the actuator 4. The actuator 4 is turned by the voice coil motor (VCM) 5, whereby the magnetic head 10 is moved to a position on the desired track of the magnetic disk 2 and is positioned there. The VCM 5 is driven by a drive current (or drive voltage) to be supplied thereto from the driver IC 15.

The magnetic head 10 includes a slider, write head 10W, read head 10R, and STO 100 which are formed on the slider. As will be described later with reference to FIG. 2, a plurality of magnetic heads 10 are provided according to the number of the magnetic disks 2.

The head amplifier IC 11 includes a circuit relating to drive and detection of the degree of fatigue of the STO 100. Further, the head amplifier IC 11 includes an STO control section 111. The STO control section 111 controls a current to be made to flow through the STO 100 of the write head 10W. The head amplifier IC 11 executes drive, drive signal detection, and the like of the STO 100. Furthermore, the head amplifier IC 11 supplies a write signal (write current) corresponding to write data to be supplied from the P/W channel 12 to the write head 10W. Further, the head amplifier IC 11 amplifies a read signal output from the read head 10R and transmits the amplified read signal to the R/W channel 12.

The R/W channel 12 is a signal processing circuit configured to process a signal relating to read/write. The R/W channel 12 includes a read channel configured to execute signal processing of read data and write channel configured to execute signal processing off write data. The R/W channel 12 converts a read signal into digital data and decodes read data from digital data. The R/W channel 12 encodes write data to be transferred thereto from the HDC 13 and transfers the encoded write data to the head amplifier IC 11.

The HDC 13 controls write of data to the magnetic disk 2 and read of data from the magnetic disk 2 both of which are to be carried out through the magnetic head 10, head amplifier IC 11, R/W channel 12, and MPU 14. The HDC 13 constitutes an interface between the magnetic disk device 1 and host 17, and executes transfer control of read data and write data. That is, the HDC 13 functions as a host interface controller configured to receive a signal transferred from the host 17 and transfer a signal to the host 17. When transferring a signal to the host 17, the HDC 13 executes error correct ion processing of data of a reproduced signal which is read and decoded by the magnetic head 10 in accordance with the control of the MPU 14. Further, the HDC 13 receives a command (write command, read command, and the like) to be transferred thereto from the host 17, and transmits the received command to the MPU 14.

The MPU 14 is the main controller (control section) of the magnetic disk device 1 and executes control of the read/write operation and servo control necessary for positioning of the magnetic head 10. Furthermore, the MPU 14 executes control and the like of managing a health status value of the magnetic head 10 including control of detecting the degree of fatigue of the STO 100. In addition, the MPU 14 executes processing of changing the arrangement of the memory area constituted of the magnetic disk 2. Details of this processing will be described later.

The driver IC 15 controls drive of the SPM 3 and VCM 5 in accordance with the control of the MPU 14. By driving the VCM 5, the magnetic head 10 is positioned to the target track on the magnetic disk 2.

The memory 16 includes a volatile memory and nonvolatile memory. For example, the memory 16 includes a buffer memory constituted of DRAMs and flash memory. The memory 16 stores therein programs and parameters necessary for the processing of the MPU 14. Furthermore, the nonvolatile memory of the memory 16 includes a health status value memory section 161 storing therein a health status value of the magnetic disk device 1. Details of the health status value memory section 161 will be described later.

Figure 2:
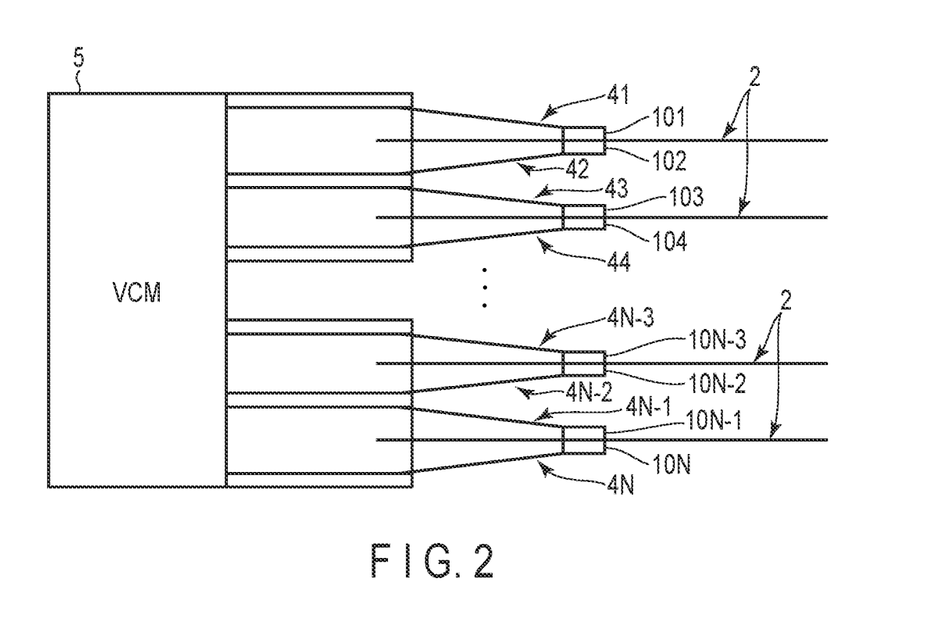
FIG. 2 is a view showing an example of the configuration including a plurality of magnetic heads according to the first embodiment.

FIG. 2 is a view showing an example of the configuration including a plurality of magnetic heads 101 to 10N.

In the configuration, actuators 41 to 4N are provided, at tips of the actuators 41 to 4N, magnetic heads 101 to 10N are respectively provided in such a manner as to correspond to the actuators 41 to 4N. The magnetic disk 2 is configured in such a manner that data can be read/written from/to both the top surface and undersurface thereof by different magnetic heads 10. For example, the magnetic disk 2 is configured in such a manner that the magnetic head 101 accesses the top surface of the magnetic disk 2 and magnetic head 102 accesses the undersurface of the magnetic disk 2. As described above, in the magnetic disk device 1, the memory areas are constituted of the plurality of magnetic disks 2.

Figure 3:
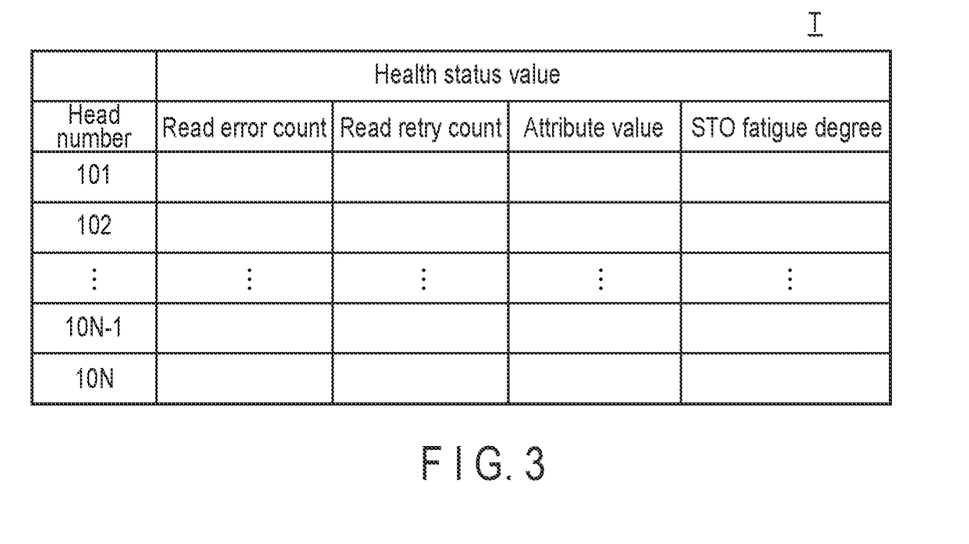
FIG. 3 is a view showing an example of a health status value memory section according to the first embodiment.

Next, the health status value to be stored in the health status value memory section 161 will be described below. FIG. 3 is a view showing an example of the health status value memory section 161.

As shown in FIG. 3, in this embodiment, to be specific, the health status value includes the read error count, read retry count, attribute value, and STO fatigue degree. The read error count is the number of times the data read by the read element 10R causes errors within a predetermined period of time. The read retry count is, when a read error occurs within a predetermined period of time, the number of times the read operation is repeated until the error-causing data can correctly be read. The attribute value is a value to be set on the basis of diagnostic conditions determined in advance. The STO fatigue degree is a value indicating the degree of fatigue of the STO 100. The STO fatigue degree can be obtained by, for example, detecting a resistance value of the STO 100. More specifically, the resistance value of the STO 100 can be obtained, by detecting the value of a current flowing through the STO, from a relationship between the detected current value and applied voltage. When the resistance value is high, the current is in the hard-to-flow state, and hence the degree of fatigue of the STO 100 is high. Further, when the resistance value is low, the current is in the easy-to-flow state, and hence it is indicated that the degree of fatigue of the STO 100 is not high. The read error count, read retry count, attribute value, and STO fatigue degree described above are stored correspondingly to the head numbers (magnetic heads 101 to 10N).

Next, the processing of transmitting the health status value to the host 17 to be carried out by the magnetic disk device 1 will be described below. The host 17 makes a request of the magnetic disk device at predetermined timing for transmission of the health status value. The predetermined timing may be at regular intervals, may be at timing of predetermined events or at both of them. It should be noted that the health status value transmission command requesting the health status value is, in the case of the standards body American National Standards Institute (ANSI), the Get Physical Elements Command.

Figure 4:
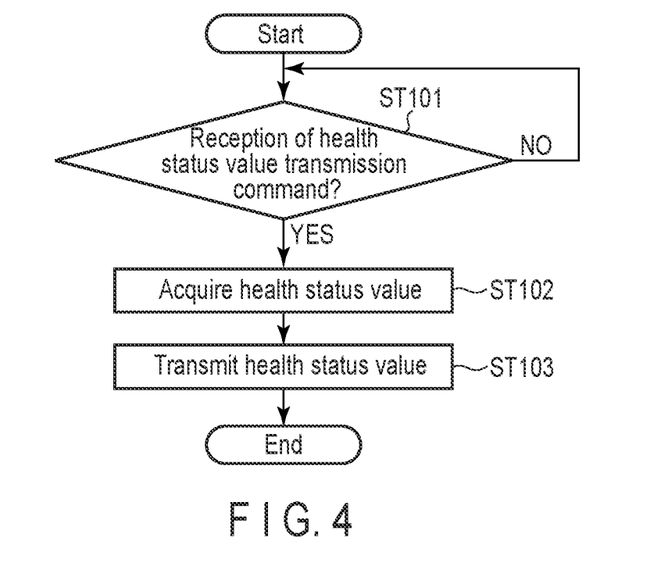
FIG. 4 is a flowchart showing an example of transmission processing of a health status value according to the first embodiment.

FIG. 4 is a flowchart showing an example of transmission processing of a health status value.

As shown in FIG. 4, the MPU 14 of the magnetic disk device 1 determines whether or not a health status value transmission command requesting transmission of the health status value has been received from the host 17 (ST101). When it is determined that no health status value transmission command has been received (ST101: NO), the processing is returned to ST101. That is, the standby state is continued.

Upon determination that the health status value transmission command has been received (ST101: YES), the MPU 14 acquires the health status value (ST102). The MPU 14 refers to the health status value memory section 161 to thereby temporarily keep the health status values of the magnetic heads 101 to 10N in, for example, the work area of the memory 16. Next, the MPU 14 transmits the health status values of the magnetic heads 101 to 10N to the host 17 (ST103). Thereby, the host 17 can acquire the health status value of each of the magnetic heads 101 to 10N of the magnetic disk device 1.

Having acquired the health status values of the magnetic disk device 1, the host 17 determines the status of each of the magnetic heads 101 to 10N on the basis of the health status values. In this embodiment, the host 17 adds up, as to each of the magnetic heads 101 to 10N, the read error count, read retry count, attribute value, and STO fatigue degree or adds up these values after subjecting these values to weighting to thereby calculate the sum total value of the health status values. When this sum total value exceeds a threshold (80%, second status) of a predetermined specified value (first status) (in other words, when a transition is made to the second status), it is determined that the health status of the magnetic head 10 is bad and, when the sum total value is equal to or less than the threshold of the specified value, it is determined that the health status of the magnetic head 10 is good.

Here, the specified value is a value of the magnetic head 10 at the time when the magnetic head 10 satisfies a condition for causing the impossibility of write of data and, to be more specific, the specified value is a value indicating a state where write of data is made impossible if the status becomes worse than the current status in consideration of the constituent elements of the health status value. In this embodiment, in the state where 80% of the specified value is reached, it is determined that the health status of the magnetic head 10 is bad. Accordingly, even a magnetic head 10 the health status of which is determined to be bad is in a state where the magnetic head 10 can still carry out write of data. It should be noted that making the threshold for determining whether the health status is bad or good a certain percentage of the specified value is not limited to making the threshold 80% of the specified value, and arbitrary other thresholds may be set if only the thresholds allow the magnetic head 10 to be in a state where the magnetic head 10 can carry out write of data.

Upon determination that there is a magnetic head 10 the health status of which has been determined to be bad, the host 17 transmits a logical depopulation execution command (hereinafter referred to as a depopulation command) which is an instruction to change the arrangement of the memory area of the magnetic disk 2 corresponding to the magnetic head 10 concerned to the magnetic disk device 1. In the depopulation command, designation information of one arbitrary element of which subjection to depopulation is required is included. In this embodiment, although the description will be given by making one element correspondent to one magnetic head 10, it can arbitrarily be set in what units one element should be treated.

Here, the logical depopulation is a standard determined by the standards body ANSI. The background of the fact that depopulation is executed is that in both the case of an area from which data has become less prone to being read and case of an area to which data has become less prone to being written, depopulation is executed in order to carry out processing of skipping such an area. It should be noted that the area from which data has become less prone to being read occurs due to a posteriori (acquired) scratch in some cases or occurs as a result of execution of write in a state where it is difficult to carry out write of data due to deterioration of the magnetic head 10 in some cases. Further, according to the standards body ANSI, the logical depopulation execution designation command (Remove Element and Truncate command) to execute logical depopulation can be executed regardless of the health status of each element, i.e., each magnetic head 10 in this embodiment.

Figure 5:
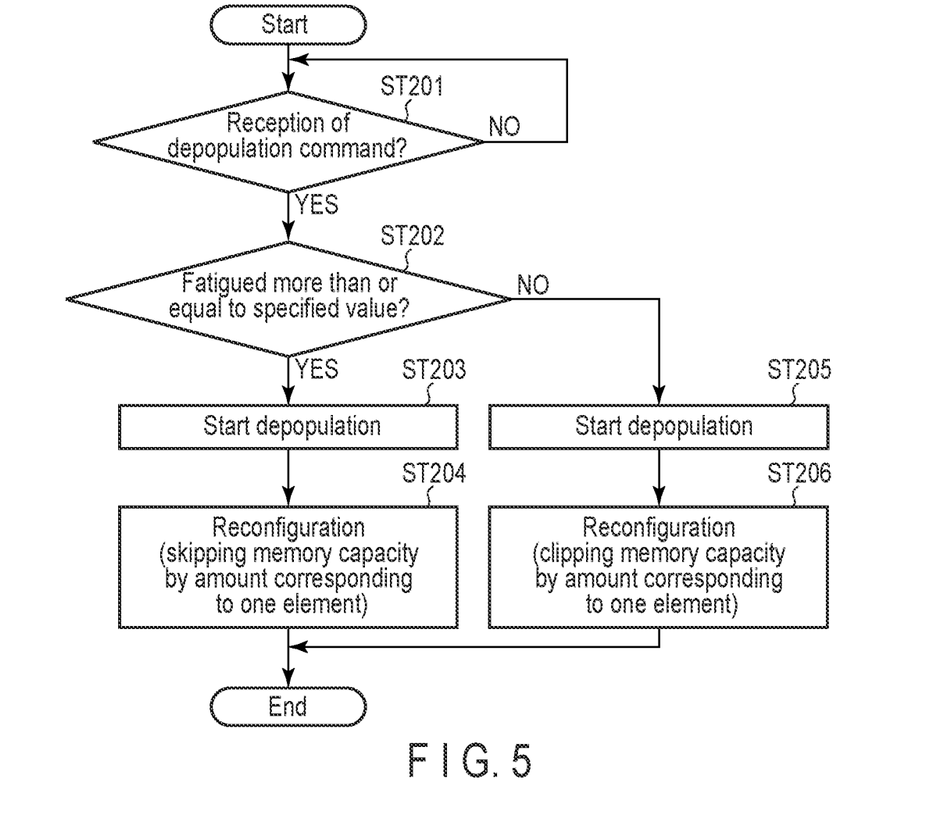
FIG. 5 is flowchart showing an example of processing of changing the arrangement of the memory area according to the first embodiment.

Next, the processing of changing the arrangement of the memory area to be carried out by the magnetic disk device 1 will be described below. In this embodiment, the expression 'change of the arrangement' implies carrying out a change of setting in such a manner that the state of a logical address is changed from a state where the logical address is included in the normal memory area (first memory area) to a state where the logical address is included in a memory area (second memory area) in which the number of times of write is limited. FIG. 5 is a flowchart showing an example of processing of changing the arrangement of the memory area.

As shown in FIG. 5, the MPU 14 determines whether or not a depopulation command has been received from the host 17 (ST201). When it is determined that no depopulation command has been received (ST201: NO), the processing is returned to ST201. That is, the standby state is continued.

Upon determination that the depopulation command has been received (ST201: YES), the MPU acquires an element indicated by the command concerned, and determines whether or not the acquired element is fatigued more than or equal to the specified value ST202). More specifically, the MPU 14 acquires the element included in the depopulation command, in this embodiment, the magnetic head 10, and refers to the health status value memory section 161 to thereby determine whether or not the health status of the magnetic head 10 is more than or equal to the specified value.

Upon determination that the health status value of the magnetic head 10 is greater than or equal to the specified value (ST202: YES), the MPU 14 starts depopulation (ST203) and carries out reconfiguration of the memory area by skipping a part of the memory area corresponding to one element (ST24). More specifically, the MPU 14 carries out processing of removing the memory area of the magnetic disk 2 corresponding to the element, in this embodiment, the magnetic head 10 the health status vale of which is greater than or equal to the specified value from the memory area of the magnetic disk device 1. Thereby, although the memory area of the magnetic disk device 1 is reduced by an area corresponding to the memory area of the magnetic disk 2 concerned, it is possible to prevent access delay due to frequent occurrence of write errors and read retries from occurring by avoiding access to the area concerned of the magnetic disk device 1.

On the other hand, upon determination that the health status value of the magnetic head 10 is not greater than or equal to the specified value (ST202: NO), i.e., the health status value is less than the specified value and greater than or equal to the threshold, the MPU 14 starts depopulation (ST205) and executes reconfiguration of clipping a part of the memory area corresponding to one element to thereby carry out relocation of the memory area (ST206). More specifically, the MPU 14 limits the write count (number of times of writes) of the memory area of the magnetic disk 2 corresponding to the element, in this embodiment, the magnetic head 10 the health status value of which is less than the specified value and greater than or equal to the threshold. In this embodiment, the area the write count of which is limited is managed as a write-once area to which write of data can be carried out once. Thereby, although the size of the memory area of the magnetic disk device 1 is not changed, the memory area of the magnetic disk 2 concerned is managed by limiting the number of times of write thereto.

Figure 6:
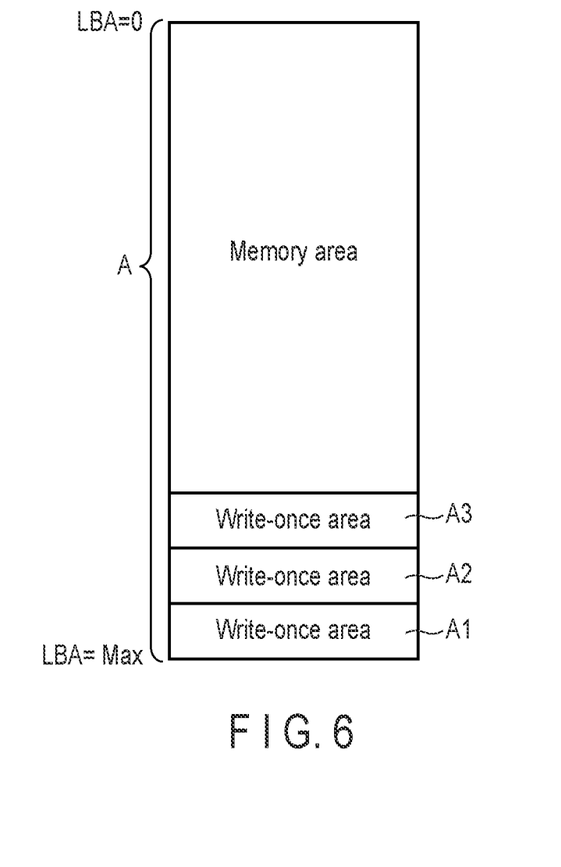
FIG. 6 is a view showing an example of a change in the arrangement of the memory area according to the first embodiment.

FIG. 6 is a view showing art example of a change of the arrangement of the memory area. In FIG. 6, the case where memory areas corresponding to three magnetic heads 10 are managed as write-once areas is shown. The entire memory area A of the magnetic disk device 1 is shown by logical block addresses (LBAs) 0 to Max. The three write-limited memory areas are managed as write-once areas A1 to A3. The write-once areas are rearranged in such a manner that the LBAs of the write-once areas are arranged from the max-side toward the 0-side according to the number of the areas. Accordingly, in the example of FIG. 6, the oldest area in terms of time is the write-once area A1, the second oldest one is the write-once area A2, and the next one is the write-one area A3. It should be noted that when the arrangement of the memory area is changed as described above, the MPU 14 transmits addresses of the normal area, addresses of the write-once areas, and upper limit of the write count (number of times of writes) (in this embodiment, once) to the host 17 at predetermined timing. For example, the MPU 14 makes a report to the host 17 by the GET PHYSICAL ELEMENT STATUS command. In addition, depopulation is executed and, as to the magnetic head 10 to which a write-once area is set, setting is made in such a manner that depopulation is never executed again.

Further, although in this embodiment, regarding the limit of the write count, the write count is limited to only once, it is possible to carry out management by limiting the write count to a plurality of times and by taking the threshold to be set to the aforementioned specified value into consideration. For example, when the threshold is set lower relatively to the specified value, the write count can be set larger. On the other hand, when the threshold is set higher relatively to the specified value, it is desirable that the write count be once.

As described above, in the magnetic disk device 1, when the magnetic head 10 makes a transition to the second status that is one status before the first status in which the magnetic head 10 becomes unable to carry out write of data to the magnetic disk 2, to be more specific, when the health status value of the magnetic head 10 is less than the specified value and greater than or equal to the threshold, it is possible to manage the memory area corresponding to the magnetic head 10 concerned as a memory area in which the write count is limited by discriminating the memory area corresponding to the magnetic head 10 concerned from the normal memory area of the magnetic disk device 1. Thereby, it becomes possible for the magnetic disk device 1 to manage the health status of the magnetic head 10 and safely carry out write of data without losing the memory area of the magnetic disk device 1. It becomes possible to provide the magnetic disk device 1 to which such a technique is applied as a useful memory area by using the magnetic disk device 1 for the purpose of, for example, data management in a data center.

Further, it is possible for the magnetic disk device 1 to prevent a state where it becomes impossible to write data from occurring by limiting the number of times of write to the memory area corresponding to the magnetic head 10 concerned. It should be noted that it is possible for the magnetic disk device 1, even when it becomes impossible to carry out write of data to the memory area concerned, to carry out read of data therefrom.

Furthermore, by definitely discriminating between the normal memory area (also referred to as a hot area) and memory area the write count of which is limited (also referred to as a cold area), and notifying the host 17 of the ranges of the above memory areas on the magnetic disk device 1 side, it becomes possible on the host 17 side to carry out management while discriminating between hot data stored in the hot area requiring update and cold data stored in the cold area never requiring update. When the aforementioned control of this embodiment is not executed, it is possible that a case where the magnetic head 10 enters a state in which the magnetic head 10 is fatigued and becomes unable to provide write guarantee will occur. Even when such a situation occurs, although it has been impossible on the host 17 side to manage the memory area corresponding to the magnetic head 10 concerned, according to the magnetic disk device 1 of this embodiment, it is possible to separate the memory area into the hot area and cold area and discriminate between the hot area and cold area, and hence it is possible to avoid such a situation.

Furthermore, as to the magnetic disk device 1, at the time of setting of the cold area, the cold area enters a clipped state, and it is possible to actually carry out rearrangement of the memory area tacitly, while apparently acting to carry out skipping in accordance with the standard as usual. In this case, in the magnetic disk device 1, the area from the LBA 0 to the clipped upper limit address of the LBA becomes the hot area. Further, the area from the upper limit address to the Max address which the host 17 can acquire by the GET NATIVE MAX ADDRESS EXIT command becomes the cold area. It becomes possible for the host 17 to access the cold area by removing the clip by the SET ACCESSIBLE MAX ADDRESS EXIT command as the need arises. Control of limiting write to the cold area is to be carried out in this embodiment by the host 17 by carrying out processing of aborting rewrite to the cold area to which write has been carried out once.

Second Embodiment

Although in the first embodiment already described above, the processing of changing the arrangement of the memory area has been carried out by utilizing the standard of the standards body ANSI, this second embodiment differs from the first embodiment in that the magnetic disk device 1 carries out processing of changing the arrangement of the memory area according to the type of the command of the host 17 without using the abovementioned standard. Accordingly, hereinafter the processing concerned will mainly be described. It should be noted that configurations identical to the above first embodiment are denoted by reference symbols identical to the first embodiment and detailed descriptions of these configurations are omitted.

Figure 7:
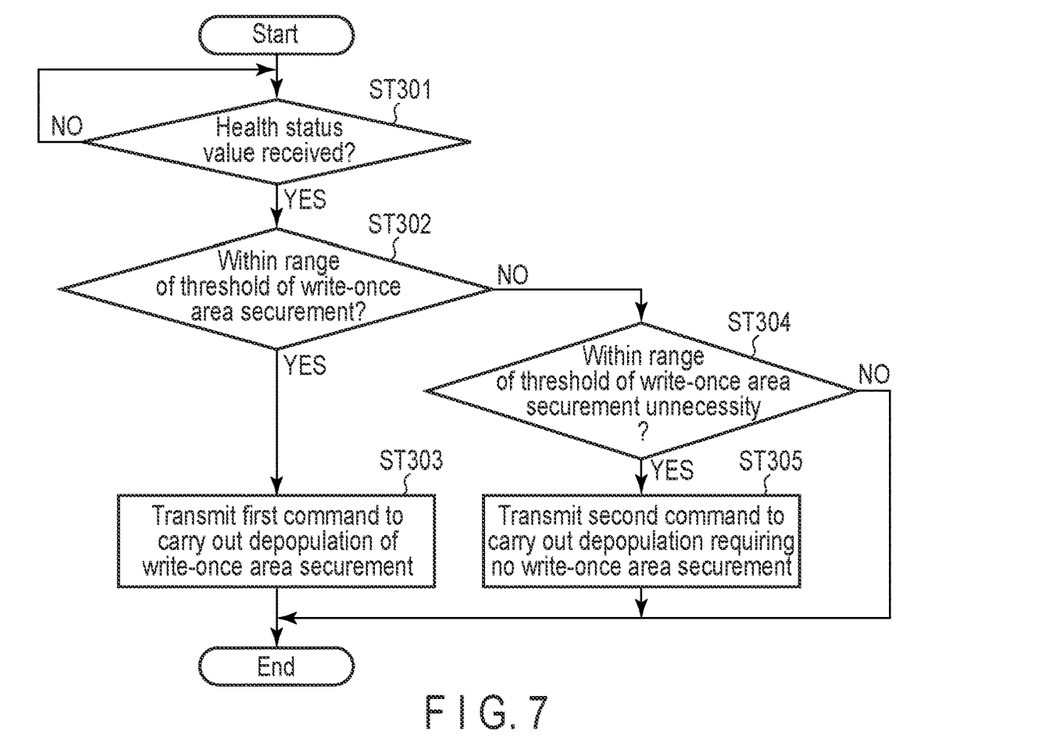
FIG. 7 is a flowchart showing an example of reception processing of a health status value according to a second embodiment.

First, the processing of the host 17 will be described below. FIG. 7 is a flowchart showing an example of reception processing of a health status value. This processing is executed, as in the case of the first embodiment already described above, after transmitting a health status value transmission request command to the magnetic disk device 1.

The host 17 determines whether or not a health status value has been received from the magnetic disk device 1 (ST301). When it is determined that no health status value has been received (ST301: NO), the processing is returned to ST301. That is, the standby state is continued.

Upon determination that the health status value has been received (ST301: YES), the host 17 determines whether or not each element, in this embodiment, each magnetic head 10 is within the range of the threshold of write-once area securement (ST302). That is, it is determined whether or not the health status value of the magnetic head 10 is, less than the specified value described previously and greater than or equal to the threshold. Upon determination that each magnetic head 10 is within the range of the threshold of write-once area securement (ST302: YES), the host 17 transmits a first command to carry out depopulation of write-once area securement to the magnetic disk device 1 (ST303). On the other hand, upon determination that each magnetic head 10 is outside the range of the threshold of write-once area securement (ST302: NO), the host 17 determines whether or not the health status value is within the range of the threshold of write-once area securement unnecessity (ST304). That is, it is determined whether or not the health status value of the one element, in this embodiment, the magnetic head 10 is greater than or equal to the specified value described previously. Upon determination that the health status value is within the range of the threshold of write-once area securement unnecessity (ST304: YES), the host 17 transmits a second command to carry out depopulation requiring no write-once area securement to the magnetic disk device 1 (ST305). It should be noted that when it is determined that the health status value is not within the range of the threshold of write-once area securement unnecessity (ST304: NO), the processing is terminated. That is, the health status value of the magnetic head 10 is in the satisfactory state, and execution of depopulation is not needed, this being the current case.

Figure 8:
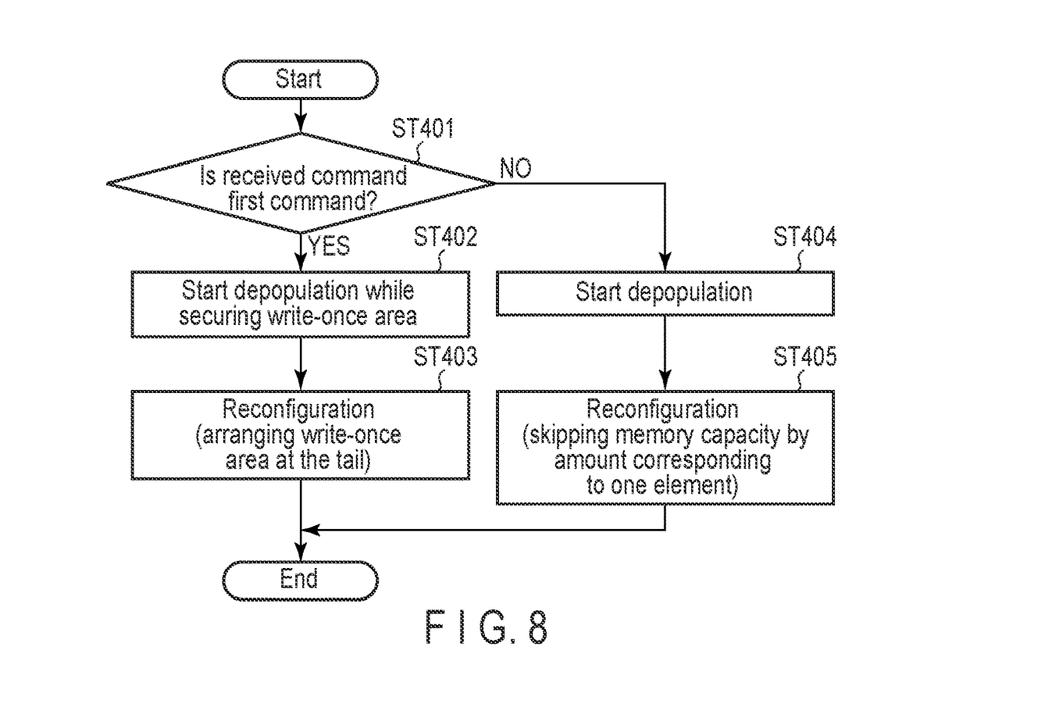
FIG. 8 is a flowchart showing an example of processing of changing the arrangement of a memory area according to the second embodiment.

Next, the processing to be executed when the magnetic disk device 1 receives a command to carry out depopulation from the host 17 will be described below. FIG. 8 is a flowchart showing an example of processing of changing the arrangement of the memory area to be executed by the MPU 14 when the command concerned is received.

As shown in FIG. 8, the MPU 14 determines whether or not the received command is the first command (ST401). Upon determination that the received command is the first command (ST401: YES), the MPU 14 starts depopulation while securing the write-once area (ST402). Then, the MPU 14 carries out reconfiguration of the memory area (ST403). This processing is processing identical to the already-described steps ST205 and ST206 and, more specifically, the MPU 14 changes the LBAs in such a manner as to arrange the write-once area at the tail of the LBAs to thereby carry out relocation of the memory area.

On the other hand, upon determination that the received command is not the first command (ST401: NO), i.e., upon determination that the second command has been received, the MPU 14 starts depopulation (ST404), and carries out reconfiguration of the memory area (ST40). The processing of each of the steps ST404 and ST405 is identical to the processing of each of the already-described steps ST203 and ST204.

As described above, arrangement of the memory area of the magnetic disk device 1 may also be carried out according to the first command or the second command. When the configuration is contrived in this way too, the Magnetic disk device 1 can exhibit an advantageous effect identical to the already-described first embodiment.

It should be noted that although in the embodiment described above, the case where a high-frequency assist section including the STO 100 is provided in the magnetic head 10 has been described, the embodiment is not limited to this. The assist section may be made a thermal assist section configured to assist write of data by means of laser light, and the fatigue degree of a near-field optical element included in the thermal assist section may be detected. Furthermore, the already-described technique is applicable to also a magnetic disk device including a magnetic head provided with no assist section.

As the data-write method of the magnetic disk device 1, the Conventional Magnetic Recording (CMR) method, and Singled Magnetic Recording (SMR) method are known. The SMR method has the feature that while the SMR method can make the recording density higher than the CMR method, the performance of the SMR method in random write is poor. The magnetic disk device 1 may also have a function of setting the magnetic disk device 1 itself to carry out write of data by the CMR method at first and, when the already-described write-once area is set, setting itself to carry out write of data to the write-once area by the SMP method. The magnetic disk device 1 carries out write of data to the write-once area by the SMR method, whereby it is possible for the magnetic disk 1 to make the recording density higher than the CMR method, and hence it becomes possible for the magnetic disk device 1 to secure the greater memory area.

While certain embodiments have been described, these embodiments have been presented by way of example only, and are not intended to limit the scope of the invent ions. Indeed, the novel embodiments described herein may be embodied in a variety of other forms; furthermore, various omissions, substitutions and changes in the form of the embodiments described herein may be made without departing from the spirit, of the inventions. The accompanying claims and their equivalents are intended to cover such forms or modifications as would fall within the scope and spirit of the inventions.

What is claimed is:

1. A magnetic disk device comprising:
    a plurality of magnetic disks;
    a plurality of magnetic heads provided correspondingly to the plurality of magnetic disks and configured to carry out read/write of data from/to the magnetic disks; and
    a control section configured to, when the magnetic head is in a second status before the magnetic head enters the first status, change setting in such a manner as to change a first memory area of a magnetic disk corresponding to the magnetic head in the second status among memory areas constituted of the plurality of magnetic disks to a second memory area in which a write count is Limited.

2. The magnetic disk device of claim 1, further comprising a memory section storing therein a data retry count indicating the number of times data is retried within a predetermined period of time, a data error count indicating the number of times data errors are detected within a predetermined period of time, and an attribute value indicating a health status of a predetermined item, wherein the first status and the second status are specified on the basis of the data retry count, the data error count, and the attribute value which are stored in the memory section.

3. The magnetic disk device of claim 2, wherein the control section outputs the data retry count, the data error count, and the attribute value which are stored in the memory section to a host at predetermined timing, and executes a change of setting of the memory area on the basis of an instruction of the host.

4. The magnetic disk device of claim 3, wherein the control section outputs an upper limit of the write count of the second memory area in which the write count is limited to the host at predetermined timing.

5. The magnetic disk device of claim 3, wherein the control section outputs an address of the second memory area in which the write count is limited to the host at predetermined timing.

6. The magnetic disk device of claim 3, wherein the magnetic head includes an assist section configured to assist write of data, and the control section further detects a degree of fatigue of the assist section.

7. The magnetic disk device of claim 6, wherein the assist section is a high-frequency assist section configured to carry out an assist by means of a high-frequency wave.

8. The magnetic disk device of claim 6, wherein the assist section is a thermal assist section configured to carry out an assist by means of laser light.

9. The magnetic disk device of claim 1, wherein the first status corresponds to a case where the magnetic head satisfies a condition for causing an impossibility of write of data.

\* \* \* \* \*